United States Patent [19]

Matsuyama et al.

[11] Patent Number: 5,169,466
[45] Date of Patent: Dec. 8, 1992

[54] METHOD OF MANUFACTURING AN ENDLESS TAPE

[75] Inventors: Masayoshi Matsuyama, Tokyo; Yoshihiko Miyasaka; Yoshiki Takao, both of Kanagawa, all of Japan

[73] Assignee: Sony Magnescale, Inc., Japan

[21] Appl. No.: 677,084

[22] Filed: Mar. 29, 1991

[30] Foreign Application Priority Data

Mar. 30, 1990 [JP] Japan .................................... 2-84485

[51] Int. Cl.$^5$ ............................................. B32B 31/18
[52] U.S. Cl. ............................ 156/157; 156/159;
156/258; 156/304.3; 156/502; 156/505;
156/506; 242/56 R; 242/58.1; 242/58.4;
242/58.5
[58] Field of Search ............ 156/157, 159, 258, 304.3,
156/502, 505, 506; 242/56 R, 58.1, 58.4, 58.5

[56] References Cited

U.S. PATENT DOCUMENTS

| | | | |
|---|---|---|---|
| 3,554,842 | 1/1971 | Byrt | 156/505 |
| 4,174,247 | 11/1979 | Dyck | 156/506 |
| 4,563,234 | 1/1986 | Kubo | 156/159 |
| 5,066,347 | 11/1991 | Yoshida | 156/505 |

FOREIGN PATENT DOCUMENTS

| | | | |
|---|---|---|---|
| 78815 | 5/1984 | Japan | 156/258 |
| 64-17222 | 1/1989 | Japan . | |

*Primary Examiner*—Caleb Weston
*Attorney, Agent, or Firm*—Ronald P. Kananen

[57] ABSTRACT

A length of tape is drawn off a reel, passed over the cutting/connecting section of a splicer, passed through a temporary storage vessel and looped back so as to pass over the cutting/connecting section again. Tape clamps hold the two layers of tape on the cutting/connecting section which are then cut. One of the tape clamps is withdrawn while an applicator applies a piece of adhesive tape in a manner which splices a continuous loop of tape. To remove a superfluous portion of the tape from the continuous loop, the loop is moved to a position wherein one end of the superfluous length is located over the cutting/connecting section. The tape is clamped and cut. One of the two tape clamps then lifts the now open end of the loop clear and the superfluous portion is spliced to the tape on a supply reel. The reel is rotated in manner which winds the superfluous length thereonto until the other end of the superfluous length is drawn to the cutting/connecting section. The tape is clamped and cut and the ends of the loop spiced to form an endless tape essentially free of superfluous length.

2 Claims, 7 Drawing Sheets

METHOD OF MANUFACTURING AN ENDLESS TAPE

BACKGROUND OF THE INVENTION

1. Field of the Invention

The present invention relates to an automatic method for producing endless tape such as that used in connection with repetitious announcements, visual displays and the like.

2. Description of the Prior Art

In order to produce an endless tape for use in announcing machines and the like type of audio and video reproducing devices, it is common for an operator to manually take the leading and trailing ends of a given length of tape and connect the same together. However, this particular technique encounters the drawbacks that the production is relatively difficult and the precision with the connection of the ends is made is less than desired. That it to say, this manual technique results in the ends being offset either a little to the left or the right. Further, the unusable portion which results from the joining operation is apt to cause damage to the remaining portion of the tape.

In order to overcome these problems an arrangement via which an endless tape could be produced automatically has been proposed in JP-A-64-17222. However, this arrangement includes the use of a leader tape and the like and is extremely complicated.

SUMMARY OF THE INVENTION

It is an object of the present invention to provide a relatively simple technique via which an endless tape can be automatically cut and connected.

In brief, the above object is achieved by a technique wherein a length of tape is drawn off a reel, passed over the cutting/connecting section of a splicer, passed through a temporary storage vessel and looped back so as to pass over the cutting/connecting section again. Tape clamps hold the two layers of tape on the cutting-/connecting section which are then cut. One of the tape clamps is withdrawn while an applicator applies a piece of adhesive tape in a manner which splices a continuous loop of tape. To remove a superfluous portion of the tape from the continuous loop, the loop is moved to a position wherein one end of the superfluous length is located over the cutting/connecting section. The tape is clamped and cut. One of the two tape clamps then lifts the now open end of the loop clear and the superfluous portion is spliced to the tape on a supply reel. The reel is rotated in a manner which winds the superfluous length thereonto until the other end of the superfluous length is drawn to the cutting/connecting section. The tape is clamped and cut and the ends of the loop spiced to form an endless tape essentially free of superfluous length.

More specifically, a first aspect of the present invention comes in a method of forming an endless tape which features the steps of: arranging a length of tape which is supplied from a supported tape reel, so that it passes over a cutting/connecting section of a splicing device, through a container having an inlet and an outlet and back over the cutting/connecting section of the splicing device, the length of tape including a given length of superfluous tape and a predetermined length is to be used for recording purposes and which is defined between an initial portion and an end portion; securing the tape length on the cutting/connecting section and cutting the tape at a location immediately proximate the end portion; splicing an end portion of the superfluous length of tape with the end portion to form a continuous tape configuration; moving the endless tape in a first predetermined direction until the initial portion is located at the cutting/connecting section; cutting the endless tape configuration at a location immediately proximate the end portion; splicing the free end of the given length of superfluous tape to the tape on the tape reel and rotating in a direction which winds the superfluous tape length onto the tape reel, stopping the rotation when the end portion reaches the cutting/connecting section; cutting the tape at a location immediately proximate the end portion; and splicing the initial and end portions to define a continuous tape which is essentially free of superfluous tape length.

A second aspect of the invention comes in a method of forming an endless tape which features: drawing a length of tape off a rotatably supported reel; passing the tape over a cutting/connecting section of a splicer, through a temporary storage vessel and looping the tape back so as to pass over the cutting/connecting section once more; clamping the two layers of tape on the cutting/connecting section using first and second tape clamps and cutting the same using a cutter; withdrawing one the first and second tape clamps and applying a piece of adhesive tape in a manner which splices a continuous loop of tape; moving the loop to a position wherein one end of the superfluous length is located over the cutting/connecting section; clamping the tape on the cutting/connecting section and cutting the tape; lifting one of the first and second tape clamps from the cutting/connecting section in a manner which lifts the now open end of the continuous loop clear of the cutting/connecting section; applying a piece of adhesive tape to splice the superfluous portion to the tape on a supply reel; rotating the reel in manner which winds the superfluous length thereonto until the other end of the superfluous length is drawn to the cutting/connecting section; clamping and cutting the tape at a location immediately adjacent the other end of the superfluous length; and applying a piece of adhesive tape to splice the tape into a loop which defines an endless tape essentially free of superfluous length.

A third aspect of the present invention comes in an apparatus for forming a continuous loop of tape which features: a rotatably supported tape reel; a cutting/connecting section which forms part of a tape splicer, the cutting connecting section including a cutter; a housing in which tape can be temporarily stored; first and second tape clamps which form part of the tape splicer and which can be selectively lowered onto the cutting/connecting section, the first and second tape clamps being associated with a source of vacuum and arranged to clamp the tape by creating a pressure differential across the tape, the first and second tape clamps being individually and independently movable; and an applicator which applies adhesive to the tape and which connects the ends thereof.

DETAILED DESCRIPTION OF THE PREFERRED EMBODIMENTS

Figure 1:
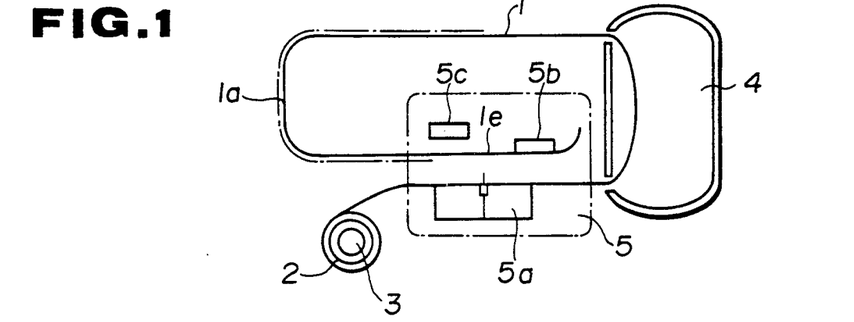
FIGS. 1-14 are views which show the steps involved with the production of an endless tape in accordance with an embodiment of the present invention.

FIGS. 1 to 14 show the steps which are executed in accordance with the present invention. In these figures 1a denotes a non-essential or superfluous portion of the tape which is located at the leading end thereof, 2 denotes a tape reel, 3 a tape reel support, 4 a container or hopper in which the endless tape is temporarily stored during production, and 5 a splicing device which cuts and connects the tape 1. As will be noted from the drawings, the container 4 has an inlet and and outlet through which the tape passes.

Figure 5:
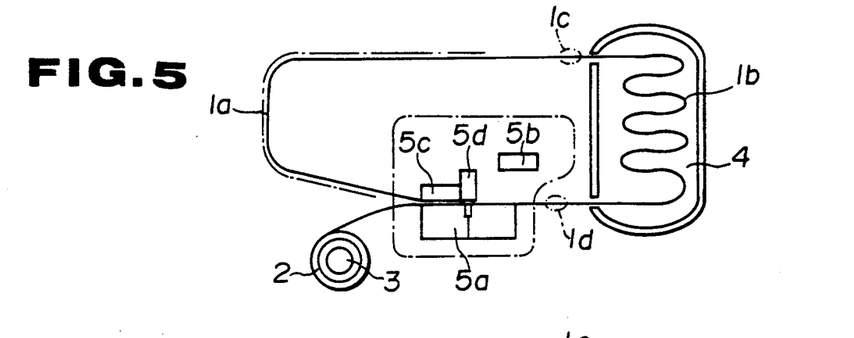
Figure 6:
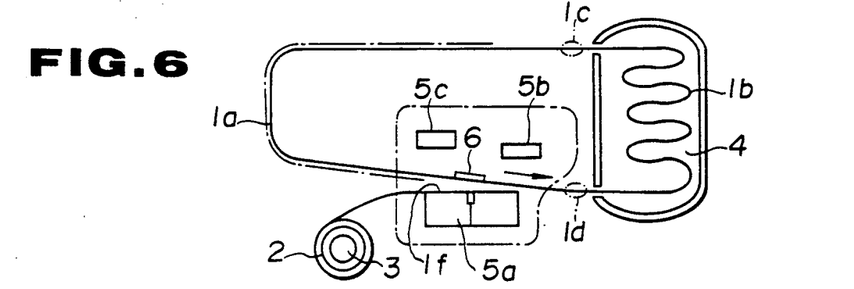

The splicing device 5 includes a cutting/connecting section 5a, tape supporting members 5b and 5c which are located thereabove, and an adhesive applicator 5d (see FIG. 5). The tape supporting members 5b and 5c include vacuum powered suction tape securing devices and are movable toward and away from the tape as required.

Although not shown for simplicity, the various elements of the above described apparatus are connected with servos/motors which are in turn controlled in accordance with a predetermined control program.

Firstly, the tape 1 is manually drawn off the tape reel and arranged so that the leading end 1e passes over the cutting/connecting section 5a of the splicer 5 (as it will be referred to hereinafter), through the container 4 and back over the splicer 5 again. At this time a tape clamp 5b is used to secure the tape to hold the leading end portion 1e in the position illustrated in FIGS. 1 and 2.

Figure 2:
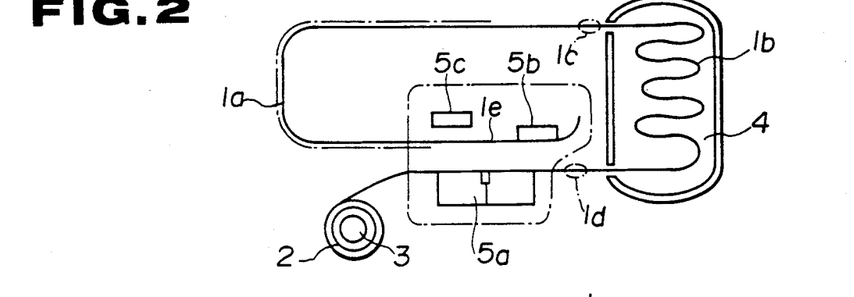

FIG. 2 shows the first stage of the automatic operation which follows the manual set up. In this stage a given length of tape is wound off the reel 3 and induced to pass over the cutting/connecting section 5a of the splicer 5 until such a time as a predetermined length of tape 1b which will become the endless tape is in the container 4 and the initial and end portions 1c and 1d between which the length 1b is defined, are located just outside of the outlet and inlets of the container. At this time the supply of tape from the reel 2 is stopped.

Figure 3:
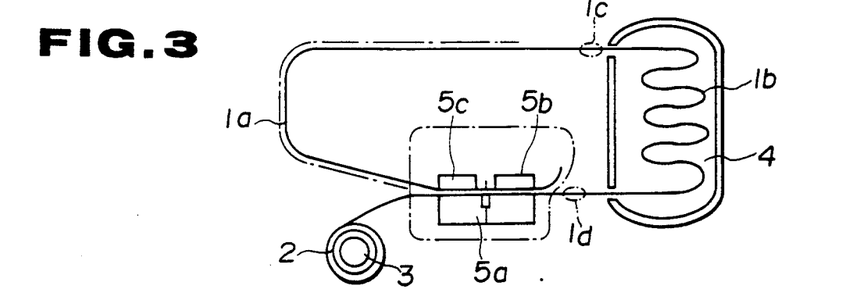
Figure 4:
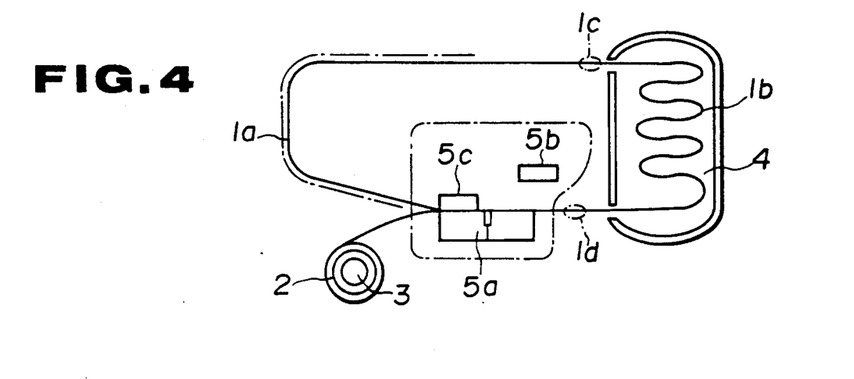

Following this, the situation illustrated in FIG. 3 is induced. Viz., the second tape clamp 5c is brought down in operative contact with the tape. Under these conditions a cutter is to cut the tape at a location defined between the two tape clamps 5b, 5c. The tape clamp 5b is then retracted and at the same time the adhesive applicator 5d is lowered into position as shown in FIG. 5 and applies a piece of adhesive tape 6 in a manner which connects the leading end of the tape to the tape disposed on top of the cutting/connecting section 5a. This connects the tape in a manner which defines an endless tape which includes the non-essential or superfluous portion 1a and leaves the leading end 1f of the tape from the reel 2 supported on cutting/connecting section 5a of the splicer 5. It will be noted that the portion of the tape which is cut off is retained by the application of vacuum and carried clear with the tape clamp 5b when it is retracted. The cut tape attached to a tape clamp 5b may then be manually removed.

Figure 7:
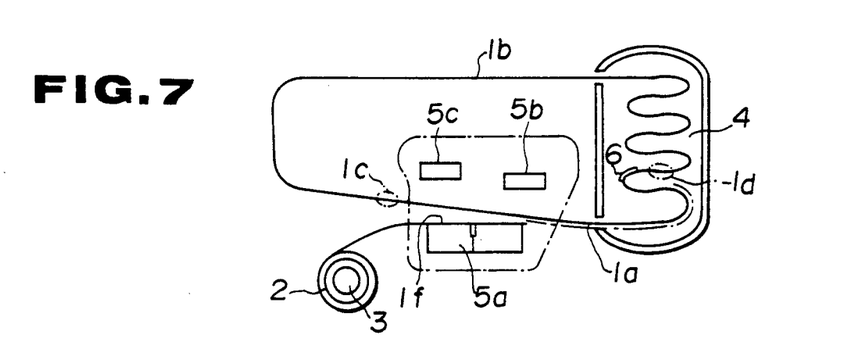

The endless tape is then moved so that the end portion 1d thereof becomes located in the container 4, and the initial portion 1a becomes located immediately adjacent the reel side of the splicer 5 and thus assume the condition illustrated in FIG. 7.

Figure 8:
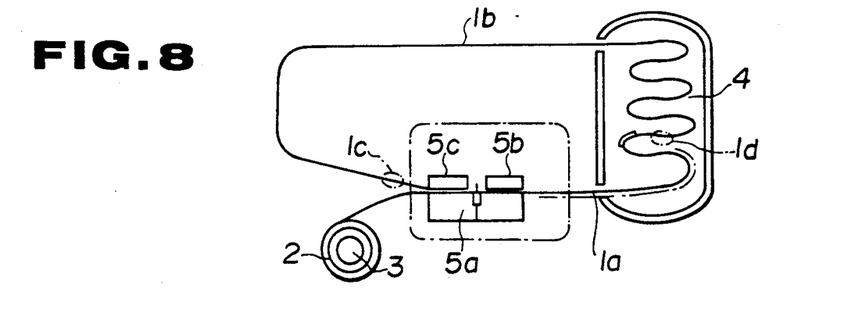
Figure 9:
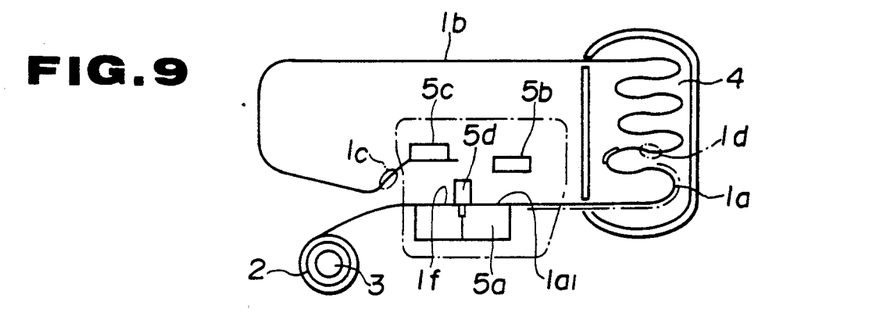
Figure 10:
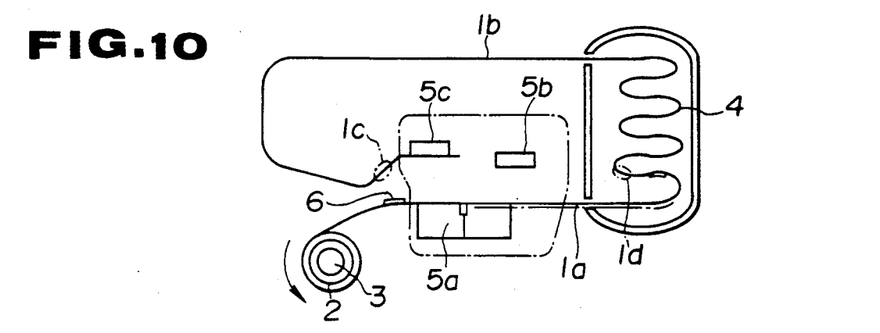
Figure 11:
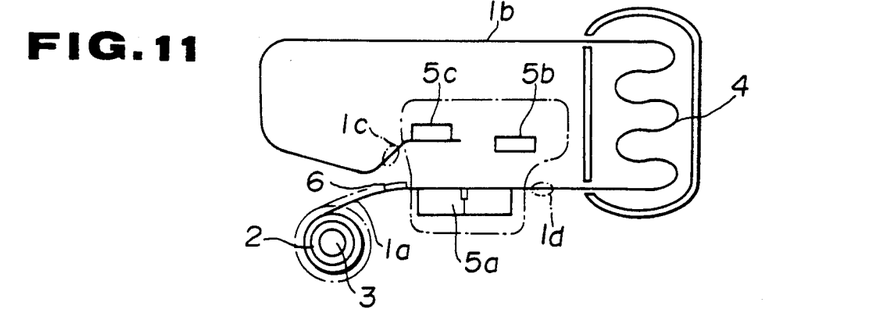
Figure 12:
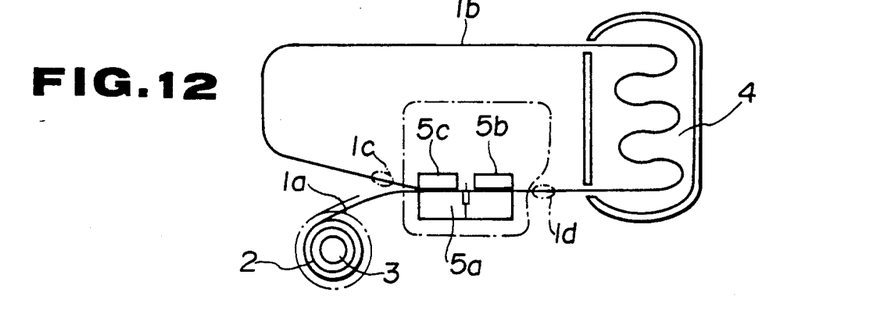

Next, as shown in FIGS. 8 and 9 the tape is clamped by the application of both of the tape clamps 5b, 5c and superfluous portion 1a of the tape 1 is out at a location immediately adjacent the initial portion 1c. Following this, vacuum is used to hold the tape against the tape clamp 5c which is retracted to the position shown in FIG. 9. A piece of adhesive tape 6 is applied by the adhesive applicator 5d in a manner which connects the superfluous tape portion 1a with the tape from the reel 2. The reel 2 is then rotated in the reverse direction to retract the tape in a manner which draws the end portion 1d out of the container 4 and brings it to a location immediately adjacent the splicer 5.

The tape clamps 5b, 5c are then lowered to clamp the tape against the splicer and again the cutter is used to cut same (FIG. 12) in a manner which essentially removes all of the superfluous length and brings the initial and end portions 1c and 1d into extremely close proximity of one another.

Figure 13:
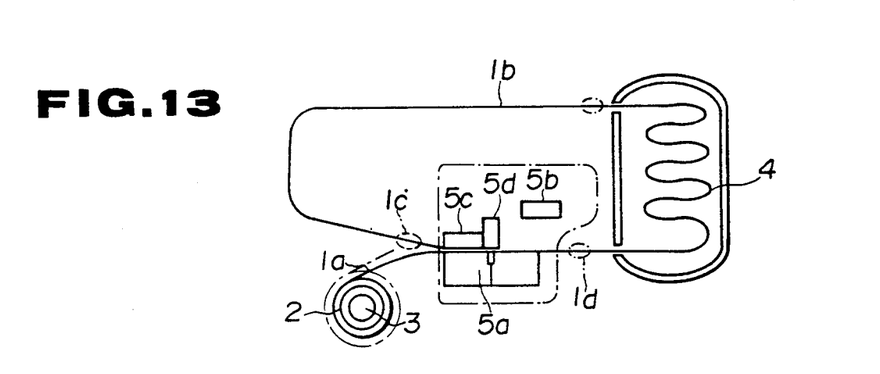
Figure 14:
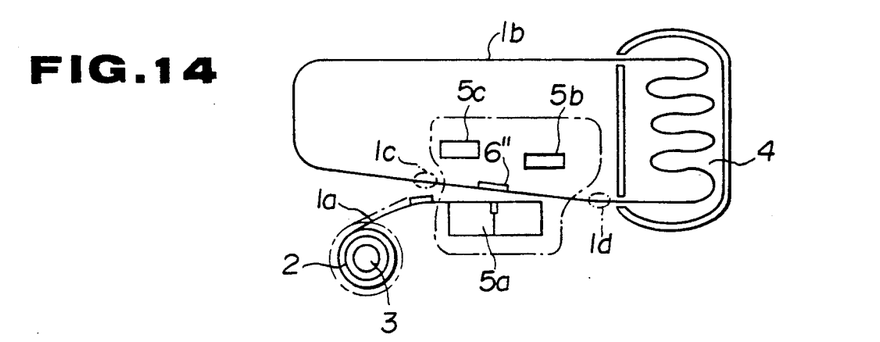

Following this, the tape clamp 5b is retracted to the position shown in FIG. 13 and a piece of adhesive tape 6 is applied to connect the tape at a position just between the initial and end portions 1c and 1d of the tape which thus assumes an endless configuration.

Further, the present invention enables used endless tape to be recovered and wound back onto the tape reel 2.

FIGS. 15 to 26 show the steps which are involved in the technique used for the above mentioned tape recovery.

Firstly, the endless tape which is to be subject to recovery is loaded into position. Viz., the endless tape 1b is arranged so that the initial and end portions 1c, 1d of the same are located on either side of the splicer 5. In addition to this an end 1a2 of a fresh strip of tape from the tape reel 2 is placed on top of the cutting/connecting section 5a.

Figure 15:
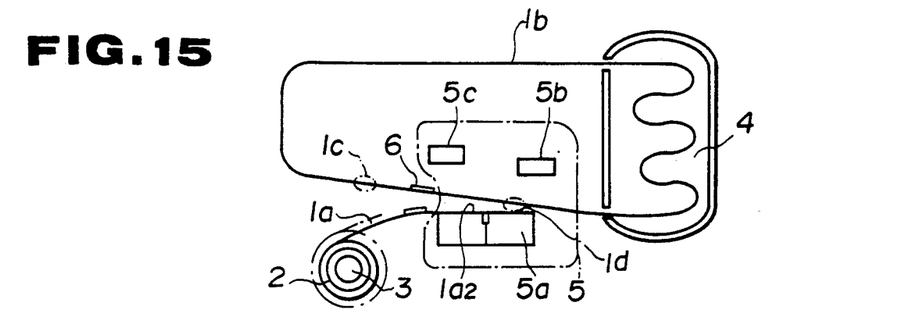
FIGS. 15 to 26 are views which show steps which are involved with one example of a technique which is used to recover used endless tape and to wind or roll the same onto a tape reel.
Figure 16:
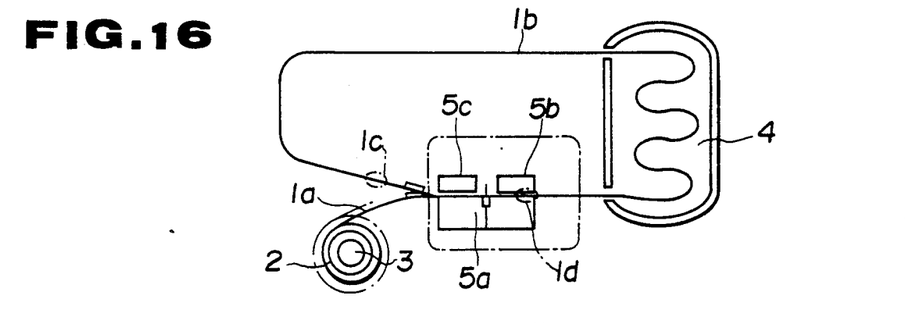
Figure 17:
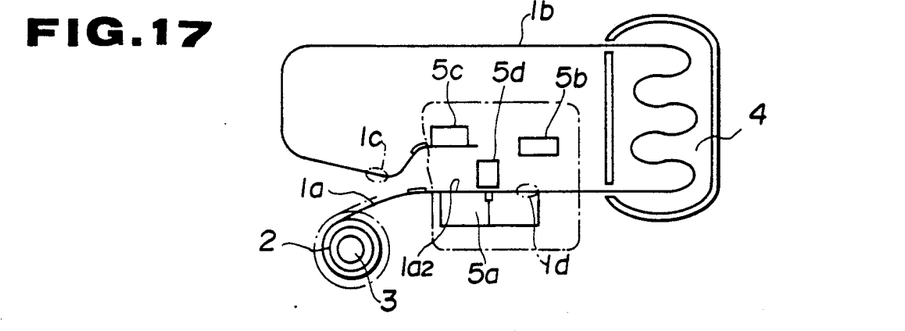
Figure 18:
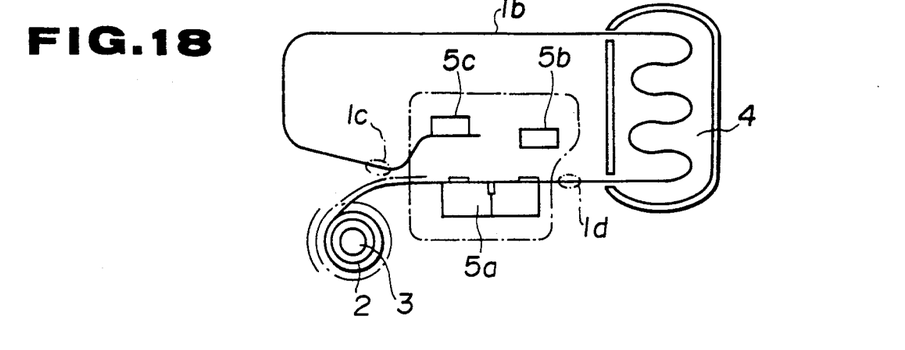
Figure 19:
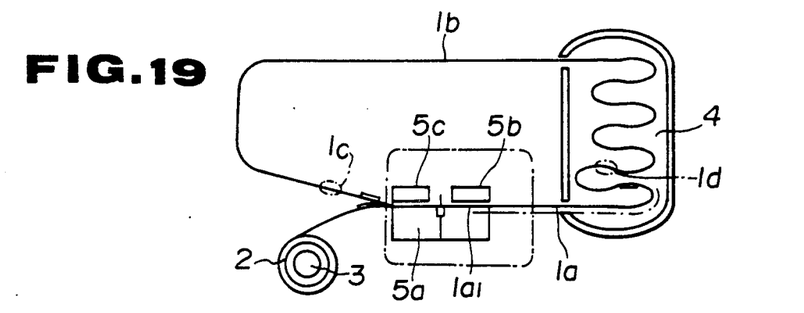
Figure 20:
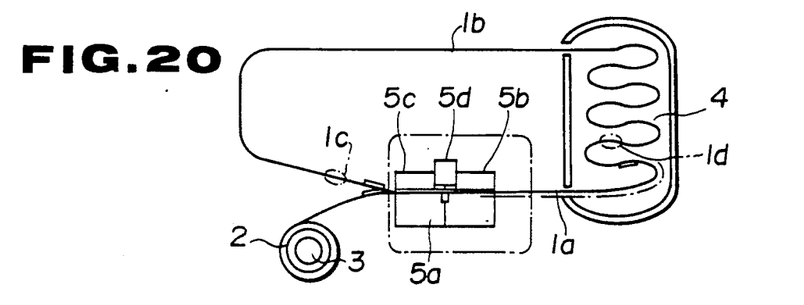
Figure 21:
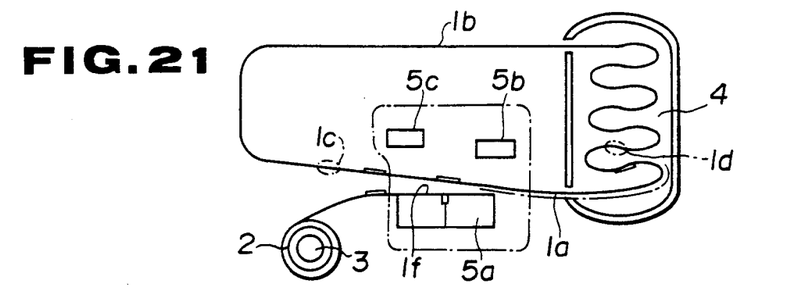

The endless tape is then moved slightly so that the adhesive tape 6 is displaced to one side of the splicer 5 and so that the condition illustrated in FIG. 15 is achieved.

Following this, the tape clamps 5b and 5c are lowered to positions wherein the endless tape is clamped in the cutting/connecting section 5a in a manner which sandwiches the two strips of tape. The endless tape is then severed between initial and end portions 1c, 1d. The tape clamp 5c is then moved upwardly in a manner which carries the free end of the endless tape upwardly to the position illustrated in FIG. 16.

Figure 22:
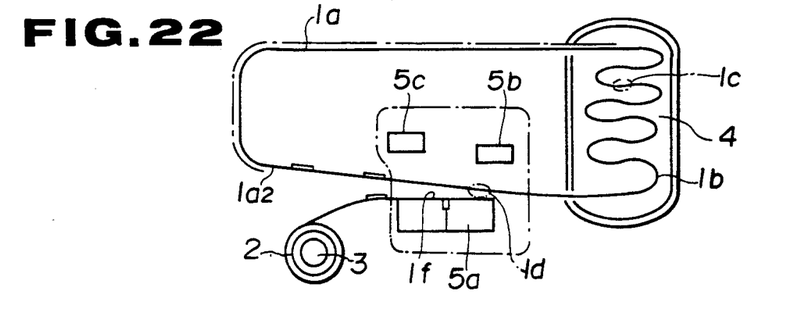
Figure 23:
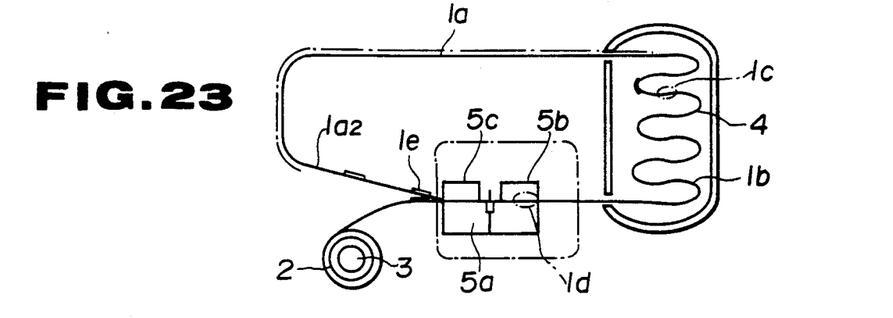
Figure 24:
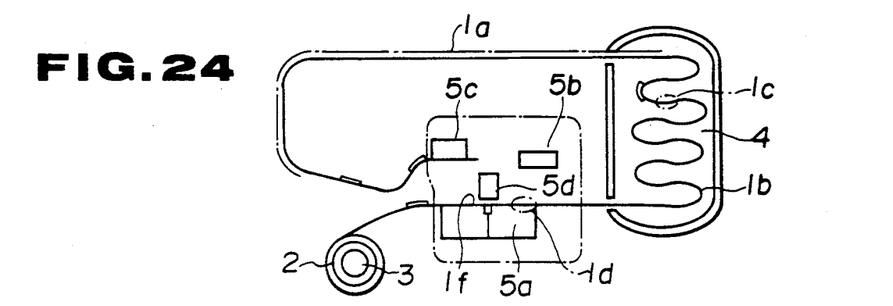
Figure 25:
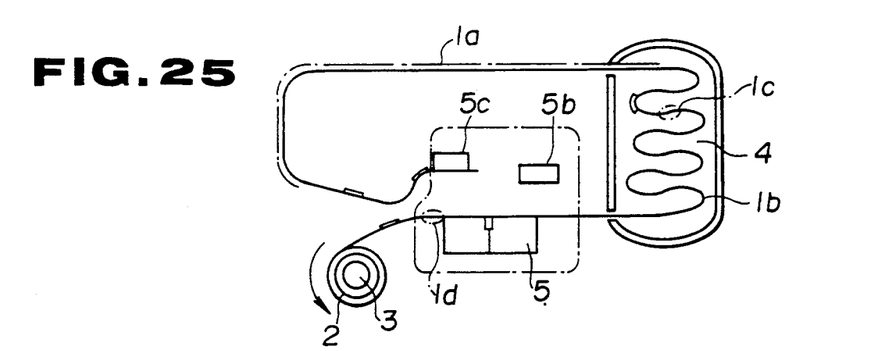
Figure 26:
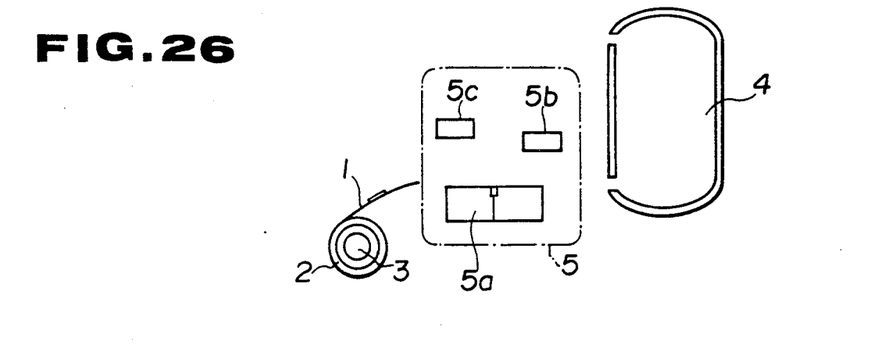

A strip of adhesive tape 6 is then applied to connect the end of the tape from the reel 2 with the end of the endless tape which remains on the splicer 5. The reel 2 is then induced to rotate in a direction which feeds tape and which moves the tape in a manner to assume the condition illustrated in FIG. 19. Viz., a condition wherein the end portion 1d is located in the container 4 and a superfluous length of tape 1a is reintroduced in to the loop. The tape clamps 5c, 5d are then lowered into position, the tape severed again (FIG. 19) and a strip of adhesive tape applied to connect the tape in manner which re-establishes an endless configuration (FIG. 21) including the superfluous length 1a. The endless tape is then moved until the end portion 1d is located over the connecting member 5a (FIG. 22). In this position, the endless tape is clamped and severed (FIG. 23). The free end of the severed tape which is in contact with the tape clamp 5c is then drawn upwardly, and a strip of adhesive 6 applied to the tape on the reel 2 with the end portion 1d of the endless tape. The reel 2 is then rotated until all of the tape has been wound thereonto and the condition illustrated in FIG. 26 is achieved.

As will be appreciated, with the present invention the accuracy and uniformity with which the cutting and connecting of the ends of the tape to form the endless configuration is carried out is improved and eliminates the drawbacks encountered with the manual technique and which enables the process to carried out automatically with the use of relative simple apparatus.

It will be of course that the present invention is not limited to the exact process disclosed above and that various modifications and changes can be made without departing from the scope of the present invention which is defined by the appended claims.

What is claimed is:

1. A method of forming an endless tape comprising the steps of:

feeding a length of tape wound on a supported tape reel, to a cutting/connecting section of a splicing device, through a container having an inlet and an outlet, and then back to the cutting/connecting section of the splicing device, said length of tape including a given superfluous length and a predetermined length to be used for recording purposes, said given superfluous length and said predetermined length each being defined between respective initial and end portions thereof, said end portion of the given superfluous length being adjacent the initial portion of the predetermined length;

securing the tape on the cutting/connecting section and cutting the same at a location immediately proximate the end portion of the predetermined length;

splicing the initial portion of the given superfluous length with the end portion of the predetermined length to form a continuous loop tape;

moving the loop tape in a first predetermined direction until the initial portion of the predetermined length is located at the cutting/connecting section;

cutting the loop tape at a location immediately proximate the initial portion of the predetermined length;

splicing the end portion of the given superfluous length to the tape on the tape reel and rotating the tape reel in a second predetermined direction in which the superfluous length is wound onto the tape reel;

stopping the rotation when the end portion of the predetermined length reaches the cutting/connecting section;

cutting the tape at a location immediately proximate the end portion of the predetermined length; and splicing the initial and end portions of the predetermined length to define a continuous loop tape which is essentially free of the superfluous length.

2. A method of forming an endless tape comprising:

drawing a length of tape off a rotatably supported reel, said length of tape including a given superfluous length and a predetermined length to be used for recording purposes, said given superfluous length and said predetermined length each being defined between respective initial and end portions thereof, said end portion of the given superfluous length being adjacent the initial portion of the predetermined length;

passing the tape over a cutting/connecting section of a splicer, through a temporary storage vessel and then back to the cutting/connecting section, so that the initial portion of the given superfluous length overlays immediately proximate the end portion of the predetermined length on the cutting/connecting section;

clamping the overlaying portions of the tape on the cutting/connecting section using first and second tape clamps and cutting the same using a cutter;

withdrawing one of the first and second tape clamps and applying a piece of adhesive tape in a manner which splices the initial portion of the given superfluous length to the end portion of the predetermined length to form a continuous loop of tape;

moving the loop in a first predetermined direction until the initial portion of the predetermined length is located over the cutting/connecting section;

clamping the tape on the cutting/connecting section using the first and second tape clamps and cutting the tape using the cutter;

lifting one of the first and second tape clamps from the cutting/connecting section in a manner which lifts the now open end of the continuous loop clear of the cutting/connecting section;

applying a piece of adhesive tape to splice the end portion of the superfluous length to the tape on the reel;

rotating the reel in a second predetermined direction in which the superfluous length is wound on the reel until the end portion of the predetermined length is drawn to the cutting/connecting section;

clamping and cutting the tape at a location immediately adjacent the end portion of the predetermined length; and applying a piece of adhesive tape to splice the tape into a loop which defines an endless tape essentially free of the superfluous length.

* * * * *